Aug. 17, 1937.  C. K. SCHWARTZ  2,090,487
COMPUTING REGISTERING MECHANISM FOR LIQUID DISPENSING APPARATUS
Filed Nov. 6, 1934   2 Sheets-Sheet 2
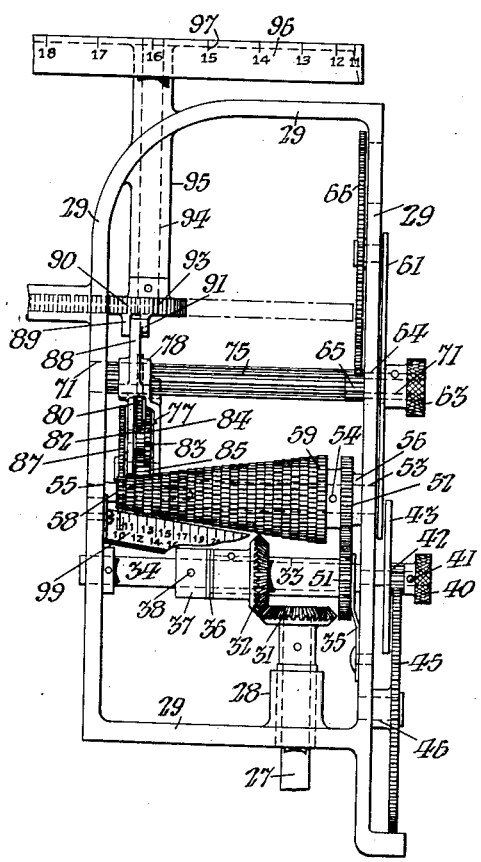
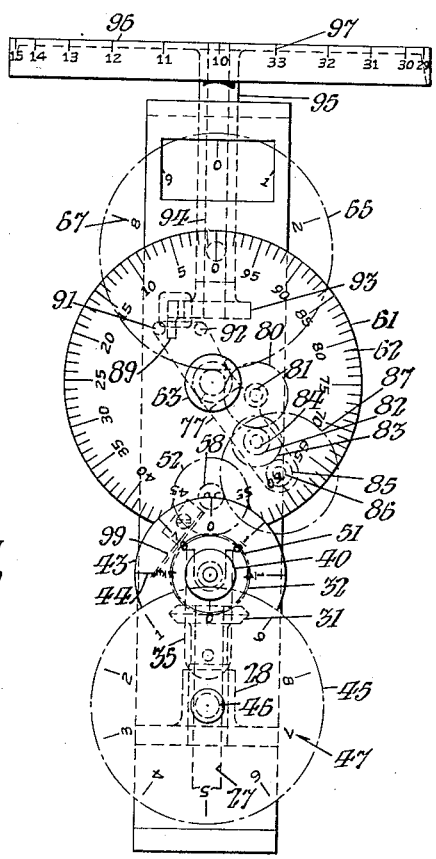
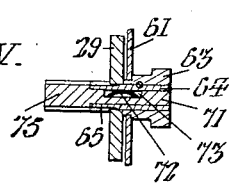
INVENTOR:
CARL K. SCHWARTZ,
BY
Attorney.

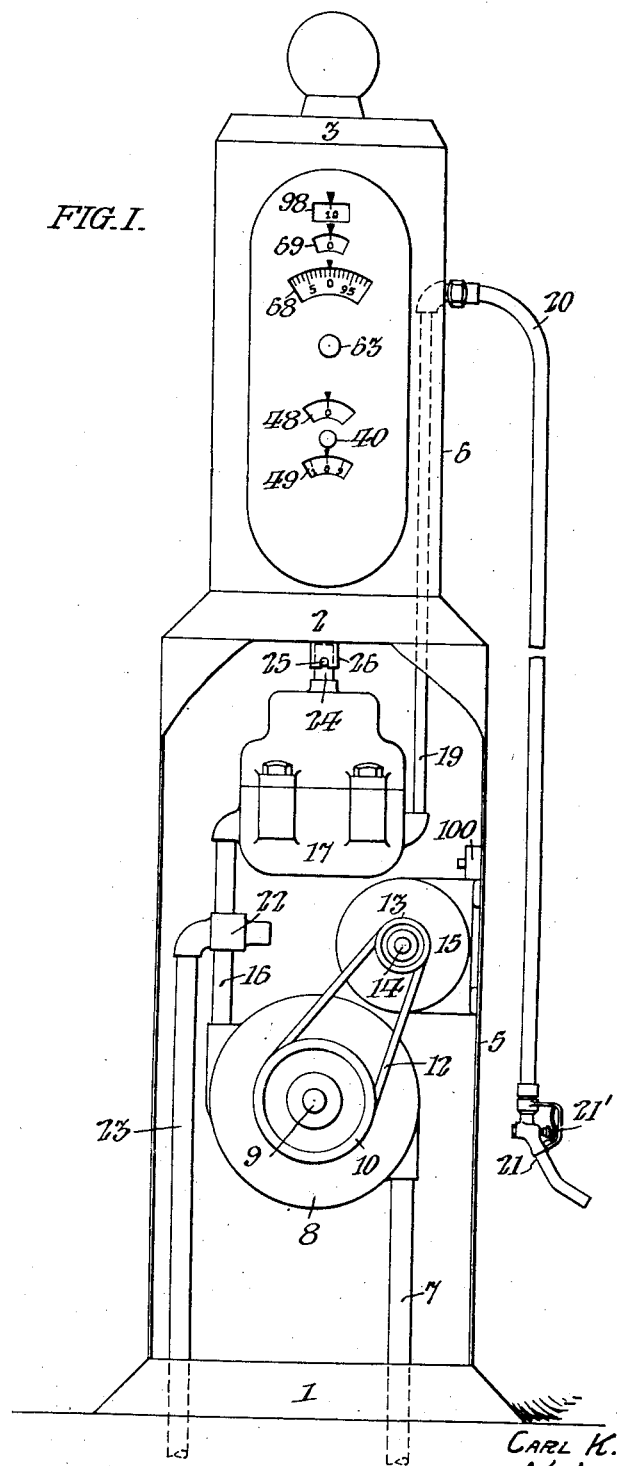
FIG. I.

Patented Aug. 17, 1937

2,090,487

UNITED STATES PATENT OFFICE 2,090,487

COMPUTING REGISTERING MECHANISM FOR LIQUID DISPENSING APPARATUS

Carl K. Schwartz, Elkhart Lake, Wis., assignor to John Wood Manufacturing Company, Inc., Conshohocken, Pa., a corporation of Delaware Application November 6, 1934, Serial No. 751,675

4 Claims. (Cl. 74—348)

My invention is particularly applicable to metering pumps for dispensing gasolene. The volume of gasolene dispensed is usually measured in gallons and fractions of a gallon and the price thereof varies per unit of volume. The purpose and effect of my invention is to provide means for displaying the current price and computing and registering the value of the volume of liquid dispensed in accordance with that price; the connection between the dispensing mechanism and the computing mechanism being manually variable in accordance with variations in such price. The principal object and effect of my invention is to provide interlocking means so connecting the price displaying means with the value computing means that the value is computed in precise accordance with the price displayed.

In the form of my invention illustrated, said computing mechanism is actuated by a member driven in definite relation to the volume of liquid dispensed, and conveniently a rotary member of a flow meter through which the liquid is dispensed, and the computing mechanism is connected with registering mechanism visibly indicating to the customer both the volume and the value of the liquid dispensed.

As hereinafter described, the computing mechanism includes a conical assemblage of gears of different sizes respectively corresponding with the price in cents per unit of volume of liquid dispensed and a movable gear connects the meter mechanism of the dispensing apparatus with any selected one of said conical assemblage of price gears. A manually rotary indicating device for displaying the price carries a gear pinion continually in mesh with a rack, which rack carries guide means continuously engaging said movable gear and determining the position of that gear with respect to the conical assemblage of gears, so that said movable gear is always presented in cooperative relation with the price gear corresponding with the price displayed by said rotary indicating means, throughout the range of variation of the price.

My invention includes the various novel features of construction and arrangement hereinafter more definitely specified.

In said drawings, Fig. I is a partly sectional elevation of a metering pump of the curbstand type, conveniently embodying my invention; a portion of the outer casing thereof being removed to disclose the interior mechanism.

Fig. II is a front elevation of the computing and registering mechanism, showing the dials which present numbers at the window openings in the casing indicated in Fig. I.

Fig. III is a left hand side elevation of the mechanism shown in Fig. II.

Fig. IV is a fragmentary vertical sectional view through the upper one of the two knobs shown in Figs. I, II, and III by which the dials may be manually set back to zero position.

Referring to Fig. I, the liquid dispensing apparatus is principally contained in a housing which is adapted to be rigidly mounted upon a pavement or a platform at a curb or driveway and includes the base member 1, the intermediate member 2, and the top member 3. Said housing includes a sheet metal casing 5, extending between said frame members 1 and 2 and the sheet metal casing 6 extending between said members 2 and 3. Both are conveniently substantially rectangular.

The liquid to be dispensed is conveniently stored in an underground tank through which it is elevated through the pipe 7 by the operation of the pump 8. Said pump includes a rotor having the shaft 9 carrying the pulley 10 connected by the belt 12 with the pulley 13 on the armature shaft 14 of the electric motor 15 which is conveniently mounted on said casing 5. The liquid is discharged from said pump 8 through the conduit 16 into the flow meter 17 from which it is discharged through the conduit 19 into the flexible dispensing hose 20 which may be provided at its free end with a nozzle 21 including a valve 21' which is normally closed but may be opened by the dispensing operator.

Said conduit 16 includes the valve 22 which, when the liquid pressure between the pump 8 and the discharge nozzle exceeds a predetermined amount will open automatically to permit the escape of the liquid through the by-pass conduit 23 back to the subjacent tank.

Said flow meter 17 includes a rotor which is turned by the passage of liquid therethrough from said conduit 16 through said conduit 19 and has the shaft 24 which makes one revolution for each gallon of liquid passed through said meter. Said rotor shaft 24 has the cross pin 25 engaging diametrically opposite slots in the coupling 26. Said coupling is carried by the lower end of the shaft 27 which is journaled in the bearing 28 in the frame 29 of the computing registering mechanism, as shown in Fig. III.

As shown in Fig. III, said shaft 27 has, rigidly connected with the upper end thereof, the bevel gear 31 engaging the bevel gear 32 which is rigidly connected with the sleeve 33. Said sleeve 33 is mounted so that it may be turned upon the shaft 34, but is normally frictionally engaged with said shaft so as to turn the latter one revolution for each gallon of liquid dispensed through the meter 17. Such engagement is effected by the spring 35 which thrusts said sleeve axially against the friction washer 36 which is interposed between the left hand end of said sleeve 33 and the abutment collar 37 which is rigidly connected with said shaft 34, conveniently by the pin 38. Said shaft 34 has, at the right hand end thereof in Fig. III, the knob 40 which is rigidly connected therewith, conveniently by the pin 41. Said knob is conveniently made integral with the gear pinion 42 and the dial 43. As indicated in Fig. II, said dial 43 has a circular series of graduations 44 indicating fractions of a gallon; the entire series representing one gallon of liquid dispensed for each revolution of said shaft 34. Said gear pinion 42 engages the gear teeth on the periphery of the dial 45 which is ten times the pitch diameter of said pinion 42. Said dial 45, which is loosely journaled on the stationary stud shaft 46 carried by said frame 29, has a circular series of graduations 47 representing ten gallons, so that each revolution of said shaft 34, effected by the dispensation of one gallon of liquid through said meter 17, turns said dial 45 one-tenth of a revolution from one gallon mark to the next in said series.

Said sleeve 33 being held stationary by its engagement with the rotor of the meter 17 between dispensing operations; said dials 43 and 45 may be manually reset to zero position with respect to the windows 48 and 49 in the casing member 6 by manual rotation of said knob 40 overcoming the frictional engagement of said sleeve with said friction washer 36.

Said sleeve 33 has, at the right hand end thereof in Fig. III, the gear 51 engaging the gear 52, of the same pitch diameter, which is rigidly connected with the shaft 53, conveniently by the pin 54 and forms part of the value computing mechanism. Said shaft 53 is journaled in said frame 29 and prevented from axial movement therein by the shoulder 55 which engages the left hand side of said frame 29 and the hub 56 of said gear 52 which engages the right hand side of said frame.

Said shaft 53 is turned one revolution for each gallon of liquid dispensed through said meter 17 by the above described connection of the meter member 24, and has, rigidly connected therewith, an assemblage of twenty-four gears of different sizes respectively corresponding with different prices of the liquid dispensed. For instance, the gear 58 represents the price of ten cents per gallon and the gear 59 represents the price of thirty-three cents per gallon; the successive gears differing from each other to the amount of one cent per gallon.

The means for indicating the computed value of the liquid dispensed includes the dial 61 which is provided with a circular series of graduations 62 representing one hundred cents. Said dial is rigidly connected with the knob 63 which is rigidly connected with the sleeve 64 journaled in the right hand side member of said frame 29, as shown in Figs. III and IV. Said sleeve 64 has the gear pinion 65 formed thereon engaging the teeth on the periphery of the dial 66 which, as shown in Fig. II, has a circular series of graduations 67 representing ten dollars. The construction and arrangement are such that when said dial 61 is turned one revolution to represent the value of one dollar, said dial 66 is turned one-tenth of a revolution to register that value by the advance of said dial 66 from zero to the one dollar mark, and each revolution of said dial 61 during a single dispensing operation is thus registered by the advance of said dial 66 from one dollar mark to the next. The numbers on said dials 61 and 66 are respectively presented at the windows 68 and 69 in said casing member 6, as indicated in Fig. I.

Said sleeve 64 is in coaxial relation with the shaft 71 which is journaled at its right hand end in said sleeve and at its left hand end in the left hand side member of said frame 29. Said sleeve 64 is continually frictionally engaged with said shaft 71 by the clutch spring 72 interposed between them in the recess 73, as shown in Fig. IV, so that said dials 61 and 66 are normally turned as if said dial 61 were rigidly connected with said shaft 71 but said dials may be reset to zero position by manually turning said knob 63.

Said shaft 71 is cut to form a long gear pinion 75 and provided with axially adjustable connecting gearing continually engaging said pinion and adapted to be selectively engaged with any one of said series of said price gears from 58 to 59 inclusive. I find it convenient to provide said price gear 58, which represents ten cents, with ten teeth, and to provide said long pinion 75 with ten teeth, and said connecting gearing is so proportioned that when the shaft 53 carrying said gear 58 is turned one revolution representing dispensation of one gallon of liquid at a value of ten cents, said pinion 75 and dial 61 connected therewith are turned one-tenth of a revolution to compute and register the value of ten cents' worth of liquid dispensed.

Said connecting gearing is carried by the swing frame 77 having the bearing 78 encircling said pinion 75 and free for oscillation and axial movement thereon, so that said gearing may be selectively connected with any one of said twenty-four price gears from 58 to 59 inclusive. Said connecting gearing includes the gear 80 continually in mesh with said pinion 75 and journaled on the shaft 81 which is fixed in said frame 77. Said gear 80 is continually in mesh with the pinion 82 which is rigidly connected with the gear 83 journaled on the shaft 84 which is fixed in said frame 77. Said gear 83 is continually in mesh with the pinion 85 which is fixed on the shaft 86 which is journaled in said frame 77 and carries at its left hand end the gear 87 which may be manually selectively engaged with any one of said series of twenty-four price gears by swinging said frame to the right in Fig. II and sliding it axially upon said pinion 75 to the desired position.

In order to cooperatively and permanently connect said swing frame 77 with means for indicating the current price of the liquid dispensed to insure that the computation of the value of the liquid dispensed shall be made in accordance with the price displayed; I provide the bearing 78 of said frame 77 with the blade 88 which is free to oscillate between the bifurcations of the guide 89 on the rack 90; its oscillation being limited by the stops 91 and 92 at the respectively opposite ends of said blade, which prevent disconnection of said swing frame from the price indicating mechanism while permitting the desired range of oscillation of said frame. Said rack 90 is of rectangular cross section and push fitted to reciprocate in its bearing fixed on said frame 29 as shown and continually in mesh with the gear 93 on the lower end of the shaft 94 which is journaled in the bearing 95 on said frame 29. Said shaft 94 has, rigidly connected with the upper end thereof, the current price display dial 96 which serves as a hand wheel by which said rack 90 may be adjusted and has a circular series of graduations 97 upon its cylindrical surface respectively identified with numbers representing the current prices of the liquid dispensed, the selected current price number being presented at the window 98 in said housing casing 6. Said numbers range from ten to thirty-three cents in correspondence with the range of the price gears 58 to 59 inclusive. I find it convenient to also provide the plane scale 99 which is supported by said frame 29 at the horizontal diameter of the series of price gears and marked to indicate the price represented by each of said twenty-four gears 58 to 59 inclusive.

The construction and arrangement above described are such that when it is desired to change the price displayed, the operator swings the frame 77 to the right in Fig. II clear of the price gears 58 to 59 inclusive and then turns the price dial 96 to display the selected price at the window 98. Such movement shifts the guide 89, by the rack 90, to bring the selector gear 87 in registry with the corresponding price gear on the shaft 53. The friction of said rack 90 in its bearing is sufficient to hold said dial 96 against accidental displacement from any position to which it is manually adjusted. Upon then releasing said swing frame 77, the gear 87 engages the price gear on the shaft 53 corresponding with the current price displayed, and said price dial 96 and the connecting gearing are held in such adjusted position by said guide 89 and rack 90, so that operation of the apparatus to dispense liquid effects computation and registration and display of the total value of the volume of the liquid dispensed, at the price displayed on the dial 96, through the window 98. That total value is displayed respectively in dollars and cents at said windows 69 and 68 shown in Fig. I.

Preparatory to each dispensing operation, the operator sets the dials 43, 45 to zero position by manually turning the knob 40. The dials 61 and 66 are also manually set to zero position by turning the knob 63. The construction and arrangement are such that said knobs may be turned in either direction but it is most convenient to turn the knob 40 clockwise and the knob 63 counter-clockwise. Thereupon, to initiate a dispensing operation, the electric motor 15 may be started by manual operation of the switch 100 and the dispensing operation initiated by manually opening the nozzle valve 21'. The dispensing operation is terminated by the operator releasing said valve 21' to permit it to return to its normal closed position. If the operator permits the motor 15 to continue to operate, the abnormal pressure of the liquid discharged from the pump 8 into the conduit 16 opens the valve 22 and permits the liquid to escape through the by-pass 23 back to the subjacent tank and thus prevent rupture of the hose 20. However, the motor 15 and the pump 8 may be stopped by opening the switch 100. The current price, volume of liquid dispensed, and total value thereof being displayed on the front of the apparatus through the windows as indicated in Fig. I may be readily observed by the customer and, upon completion of the sale, the operator restores the dials to zero position by turning said knobs 40 and 63 as above described.

Although, for convenience of illustration, I have indicated the current prices in whole cents, it is to be understood that fractional numbers may be employed with corresponding price gears. Moreover, I do not desire to limit myself to the precise details of construction and arrangement herein set forth, as it is obvious that various modifications may be made therein without departing from the essential features of my invention, as defined in the appended claims.

I claim:

1. In an apparatus of the class described, the combination with a coaxial group of gears of respectively different diameters, of a pinion having its axis parallel with the axis of said group and extending from end to end of said group; a swing frame journaled on said pinion; a train of gears carried by said swing frame one of which is continually engaged with said pinion and another of which gears is adapted for selective engagement with any one of said group of gears; a blade projecting from said swing frame; a gear rack carrying a guide for continual engagement with said swing frame blade in any position of oscillation of said frame; means supporting said rack for movement parallel with the axis of said pinion; a gear continually engaged with said rack and having its axis extending transversely to the axis of said pinion; a shaft rigidly connected with said rack gear; a dial rigidly connected with said shaft and provided with a circular series of numbers; whereby, movement of said swing frame to selective engagement with any one of the gears in said group effects longitudinal movement of said rack and rotary movement of said dial, and indicates by a corresponding number on said dial which of the gears in said group has been selectively engaged.

2. Mechanism as in claim 1; wherein said pinion carries a dial provided with a circular series of graduations for indicating the rotary position of the pinion.

3. Apparatus as in claim 1; wherein a dial provided with a circular series of graduations, is provided with gear teeth at its periphery in mesh with said pinion; whereby, the extent of rotation of said pinion is indicated by said graduations.

4. Apparatus as in claim 1; wherein said pinion carries a dial provided with a circular series of graduations for indicating the rotary position of the pinion; and a dial provided with a circular series of graduations is provided with gear teeth at its periphery in mesh with said pinion; whereby, the extent of rotation of said pinion is indicated by said graduations.

CARL K. SCHWARTZ.